United States Patent
Stadler

[19]
[11] Patent Number: 6,039,322
[45] Date of Patent: Mar. 21, 2000

[54] SEALING ARRANGEMENT

[75] Inventor: Rolf Stadler, Heppenheim, Germany

[73] Assignee: Firma Carl Freudenberg, Weinheim, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/963,721

[22] Filed: Nov. 4, 1997

[30] Foreign Application Priority Data

Nov. 23, 1996 [DE] Germany .............................. 196 48 602

[51] Int. Cl.$^7$ ............................................... F16J 15/32
[52] U.S. Cl. ............................ 277/551; 277/572; 277/573
[58] Field of Search .................................... 277/549, 572, 277/573, 551; 384/477, 484

[56] References Cited

U.S. PATENT DOCUMENTS

| | | | |
|---|---|---|---|
| 4,611,931 | 9/1986 | Brandenstein et al. .................. | 384/477 |
| 4,780,004 | 10/1988 | Anguera .................................... | 384/484 |
| 4,874,261 | 10/1989 | Colanzi et al. ........................... | 384/484 |
| 4,974,973 | 12/1990 | Janeke ...................................... | 384/484 |
| 4,991,982 | 2/1991 | Colanzi et al. ........................... | 384/486 |
| 5,022,770 | 6/1991 | Guasch ...................................... | 384/477 |
| 5,370,404 | 12/1994 | Klein et al. .......................... | 277/549 X |
| 5,458,420 | 10/1995 | Otto ......................................... | 384/448 |
| 5,509,667 | 4/1996 | Klein et al. ......................... | 384/486 X |
| 5,611,548 | 3/1997 | Dahlhaus ............................. | 384/486 X |

*Primary Examiner*—Anthony Knight
*Assistant Examiner*—Alison K. Pickard
*Attorney, Agent, or Firm*—Kenyon & Kenyon

[57] ABSTRACT

A sealing arrangement in which a rotary shaft lip seal is arranged in a housing bore hole under radial prestressing. The lip seal has a sealing lip sealingly surrounding a shaft to be sealed. The sealing lip is arranged on a first, radially inwardly pointing leg of a thrust ring made of tough material. An axially extending second leg of the thrust ring is provided with a coating of elastomer contiguous with the sealing lip on its radial exterior that is also under radial prestress when positioned against the wall delimiting the housing bore hole. A roller bearing is arranged in the radial direction between the second leg and the shaft, and the sealing lip is arranged in the axial direction on the side of the roller bearing and the first leg facing the space to be sealed. The second leg is at least partially enclosed by the coating on an end face facing away in the axial direction and, together with the coating, can be positioned against a longitudinal limit stop provided by the bore wall in a vibrationally isolated manner.

15 Claims, 1 Drawing Sheet

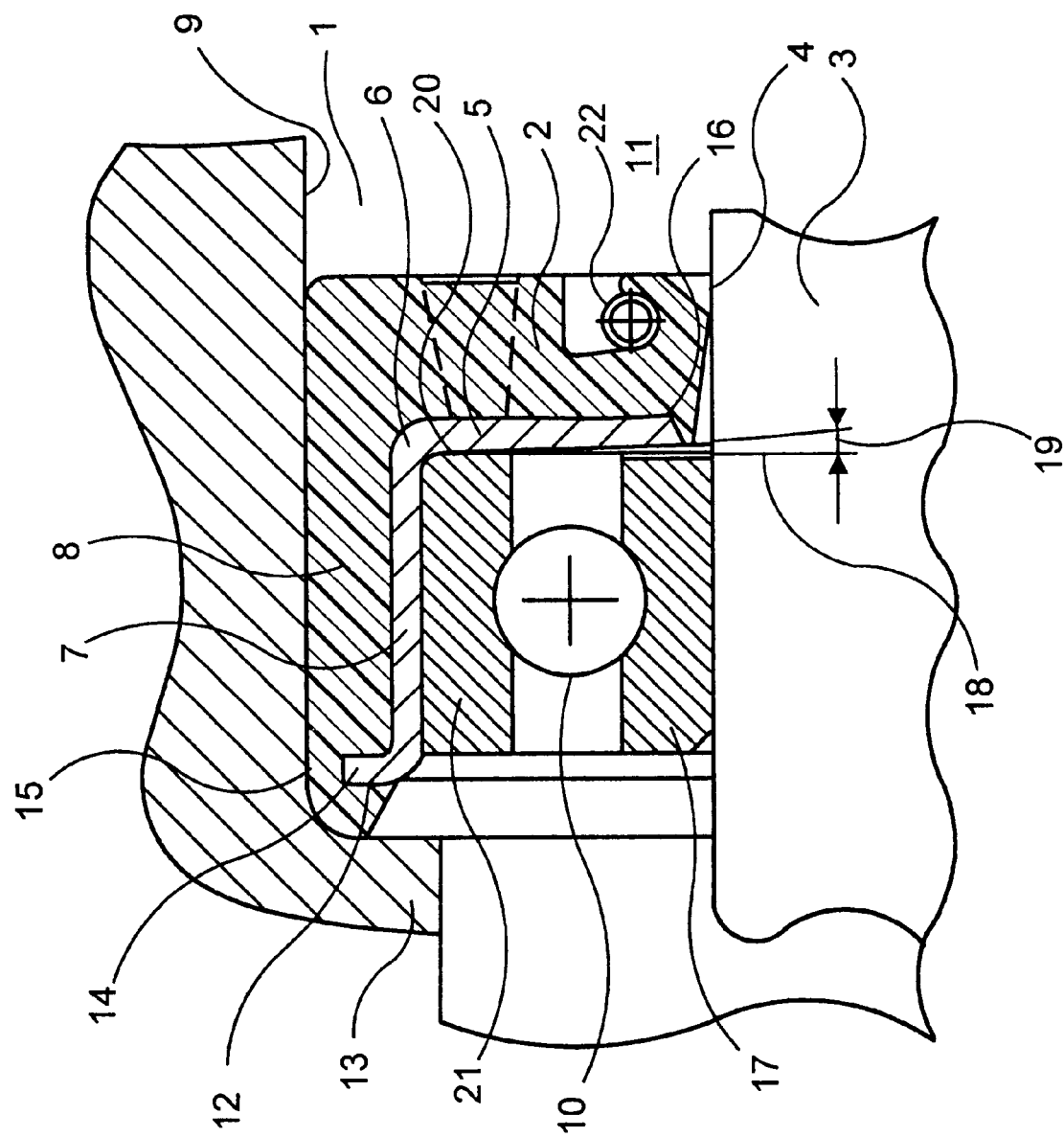

SEALING ARRANGEMENT

BACKGROUND OF THE INVENTION

The present invention relates to a sealing arrangement comprising a rotary shaft lip seal that is arranged in a housing bore hole and which includes, under radial prestressing, a sealing lip that sealingly surrounds the shaft to be sealed. The sealing lip is arranged on a first, radially inwardly pointing leg of a thrust ring made of a tough material. The axially extending second leg, radially displaced from the first, has a coating of elastomeric material which, under radial prestressing, is positioned against the wall delimiting the housing bore hole. A roller bearing is arranged in the radial direction between the second leg and the shaft, and the sealing lip is arranged in the axial direction on the side of the roller bearing and the first leg facing the space to be sealed.

This general type of a sealing arrangement is disclosed in German utility model patent 94 00 766. The roller bearing is constructed as a ball bearing and comprises an outer and an inner race which are braced against each other by balls formed as rolling elements. The outer race comprises two axially tandem-joined ring sections which are forced against the rolling elements by means of a spring element producing a prestressing of the bearing. A sealing device seals an annular gap, formed by the races, with respect to the bearing surroundings. The sealing device is prevulcanized to the outer race section and is configured integrally and continuously with the roller bearing. However, in this structural arrangement, the roller bearing is combined with the sealing device in a comparatively complicated manner, which is not very satisfactory economically or from the standpoint of production engineering. For example, it is not possible to separately replace the bearing and/or the sealing ring in this device. Furthermore, the known device does not provide any radial and axial vibration isolation.

SUMMARY OF THE INVENTION

The present invention is directed to the problem of further developing a sealing arrangement of the type discussed above that reliably prevents vibrations from being transferred from the shaft to be sealed to the housing via the roller bearing and the rotary shaft lip seal.

In particular, a sealing arrangement for sealing a shaft against a housing containing a bore hole having an end is provided. A thrust ring made of a tough material, and having a first, radially inwardly directed leg and an axially extending second leg, contiguous with the first leg, supports a rotary shaft seal that is configured to be fitted into the housing bore. The rotary shaft seal has a sealing lip that is configured to surround and be radially prestressed against the shaft, the sealing lip being arranged on the first leg of the thrust ring. The rotary shaft seal further comprises a coating of elastomeric material that extends along the radially outer surface of the second leg that also is radially prestressed when it is inserted into a housing bore defining an inner wall, so that the coating of elastomeric material is positioned against the inner wall of the housing bore hole. A roller bearing is provided in the radial direction between the second leg and the shaft, with the sealing lip arranged in the axial direction on a side of the roller bearing and the first leg facing the space to be sealed.

The second leg is at least partially enclosed by the coating on an end face of the second leg facing away from the space to be sealed and, together with the coating, is positionable against a longitudinal limit stop of the inner wall of the bore in a vibrationally isolated manner. Thus, excluding the elastic coating, the thrust ring is only in contact with the outer ring (i.e., the trace) of the roller bearing, and is not in contact at any point with the housing or the shaft. Hence, the transfer of vibrations from the rotating shaft to the housing by way of the rotating inner ring and the rotating rolling elements, the outer ring (which is stationary relative to the housing) or the thrust ring is precluded. In addition, the vibration isolation reduces the noise caused by operation.

Preferably, the thrust ring has an essentially Z-shaped cross-section. Due to its simple geometry, the thrust ring can be produced easily and cost-effectively. The thrust ring preferably is made of a metallic material that can be deformed without cutting and is produced, for example, by deep drawing.

Preferably, the end face of the thrust ring has a radial projection surrounded with radial clearance by the wall, the gap formed by the clearance being filled in with the coating. The radial projection reinforces the coating. Furthermore, because the radial projection extends parallel to the longitudinal limit stop of the housing, it helps provide a cant-free, improved, spatial allocation of the sealing arrangement with respect to the housing.

The first leg of the thrust ring comprises a first segment that angles away from the roller bearing towards the space to be sealed, and is generally adjacent to, though axially offset from, the inner ring of the roller bearing, so that the two elements do not contact one another. Preferably, this first segment area forms an acute angle of 2 to 15 degrees with respect to a radial plane. An advantage of this feature is that the mounting space of the roller bearing does not form a component of the space to be sealed, so that the encapsulated bearing is not subject to any differential pressures. The same pressure prevails outside of the space to be sealed as within the permanently lubricated bearing. The release of pressure prevents loss of lubricant from the bearing, and the durability of the roller bearing is perceptibly increased. Because the first segment is offset in the direction of the space to be sealed, the free relative mobility of the roller-bearing inner ring with respect to the roller-bearing outer ring is ensured. The thrust ring has a second segment contiguous with the first which contacts the outer ring of the roller bearing at its axial end face.

Preferably, the coating and the sealing lip are made of uniform material and integrally constructed. In this context, the elastomeric material of which the sealing lip and the coating are made is provided both for the dynamic sealing of the rotating shaft and for static sealing with respect to the housing. The uniformity of material and integral construction allow the sealing arrangement to be manufactured in a cost-effective manner from the standpoint of production engineering.

The first and the second leg each are preferably provided with elastomeric material for the coating only on the side facing away from the roller bearing. The coating arranged radially on the outer side of the second leg damps vibrations produced, for example, by a shaft imbalance. The outer ring of the roller bearing is in direct contact with the thrust ring, radially on the inner side of the first leg, said thrust ring being made preferably of a metallic material. The roller bearing is forced into the thrust ring in such a way that the end face facing the space to be sealed is in contact with the first leg extending in the radial direction. Thus, the positioning of the roller bearing within the thrust ring is particularly simple. In addition, the unit comprising the rotary shaft lip seal and the roller bearing, which can be preassembled, is dimensionally compact in the axial direction.

The sealing arrangement can be used as a bearing sleeve to accommodate a crankshaft bearing of a combustion engine. By using the sealing arrangement as a bearing sleeve, it is not necessary to produce bearing seats in the crankcase of the combustion engine by machining. In the sealing arrangement, on one hand, a roller bearing is accommodated in a vibration-damping manner, and on the other hand, the shaft passage through the housing is sealed. The elastic coating easily compensates for diameter tolerances of the second leg, the thrust ring and/or the housing bore hole.

BRIEF DESCRIPTION OF THE FIGURE

The FIGURE illustrates, in cross-section, an embodiment of a sealing arrangement constructed according to the principles of the invention.

DETAILED DESCRIPTION

The drawing illustrates a preferred embodiment of a sealing arrangement used as a bearing sleeve for accommodating a roller bearing 10, in this particular embodiment serving as a crankshaft bearing. A rotary shaft lip seal 2 is forced into a housing bore hole 1, said housing bore hole 1 forming a component of the crankshaft housing of a combustion engine. Rotary shaft lip seal 2 surrounds, with a dynamically stressed sealing lip 4, a shaft 3 to be sealed, sealing lip 4 being joined to the radially inwardly pointing leg 5 of a thrust ring 6. The thrust ring 6 has a second leg 7, which extends in the axial direction and which is provided on its radially outer surface with a coating 8 of elastomeric material, which is serves as a static sealing device. Coating 8 and sealing lip 4 are configured integrally and continuously with one another and are made of an identical elastomeric material. Coating 8 is sealingly enclosed radially on the outside, under radial prestressing, by a wall 9 bounding housing bore hole 1. In addition, coating 8 is elastically prestressed in the area of a radially extending end face 12 of a radial projection 14 that is located on the second leg 7, away from the space to be sealed. The second leg 7 is enclosed by the coating 8 on the end face 12, facing away from the space to be sealed, and is positioned against a longitudinal limit stop 13 of the wall 9 through the coating 8 in a vibrationally isolated manner. Located between the boundary of the radial projection 14 on the outer peripheral side of the second leg 7 and the wall 9, is a gap 15 that is likewise filled in with coating 8.

In the illustrated embodiment, the roller bearing 10 is constructed as a grooved ball bearing having inner and outer races. The outer race 21 (or ring) is forced against the second leg 7. The roller bearing 10 and the sealing device form a unit which can be preassembled. Sealing lip 4 is arranged in the axial direction on the side of roller bearing 10 and the first leg 5 facing space 11 to be sealed. To ensure a good mobility of inner ring 17 and outer ring 21 of the roller bearing 10 relative to one another, first leg 5 is subdivided into two segments 16 and 20 that are radially mutually adjacent, the radially inner first segment 16 being deformed in the direction of the space 11 to be sealed. Hence, there is no contact of inner ring 17 with inner segment 16 during the normal use of the sealing arrangement. In this manner, the ability of the inner ring 17 to rotate relative to the outer ring 21 of the roller bearing 10 pressed against the thrust ring 6 is unfettered by the thrust ring. The first segment 16 and a radial plane 18 form an angle 19 of between 2 to 15 degrees. In the illustrated preferred embodiment, this angle is 7°.

To ensure a sufficiently great level of radial contact pressure of sealing lip 4 against the surface of shaft 3 under all operating conditions, rotary shaft lip seal 2 is provided with an annular helical spring 22.

To further improve the static sealing and the fit of the sealing arrangement, as well as the assembling capability in housing bore hole 1, coating 8 can be provided radially on the outside with an undulation extending in the axial direction.

Because thrust ring 6, in the incorporated state, is not in contact with the wall 9 of the housing bore hole 1 at any point, but rather is allocated to it in a vibrationally isolated manner through coating 8, the noises arising through the operating conditions are perceptibly reduced.

What is claimed is:

1. A sealing arrangement for sealing a shaft, comprising:
   a thrust ring including a first radially inwardly pointing leg and an axially extending second leg, the second leg having radial external characteristic, the thrust ring having a coating composed of an elastomeric material, the coating, under a radial prestressing, being positioned against a wall of a housing which defines a bore hole of the housing, the first leg composed of a hard material, the second leg being at least partially enclosed by the coating on an end face, the end face facing away from a space of the housing to be sealed, the second leg and the coating being positioned against a longitudinal limit stop of the wall in a vibrational isolating manner, the coating separating the longitudinal limit stop from the end face;
   a roller bearing provided in a radial direction between the second leg and the shaft, the roller bearing including a radially inner race which has a side portion, the side portion of the inner race extending in a substantially vertical direction; and
   a rotary shaft seal provided in the bore hole, the seal including a sealing lip which surrounds the shaft, the seal being radially prestressed to arrange the sealing lip on the first leg, the sealing lip provided in an axial direction on a particular side of the roller bearing and on the first leg facing the space in the housing to be sealed,
   wherein the first leg extends at an acute angle from the side portion of the inner race, and wherein the first leg and the second leg, respectively, are provided with the elastomeric material only on a side facing away from the roller bearing.

2. The sealing arrangement according to claim 1, wherein the first leg is situated at a predetermined distance from the side portion.

3. The sealing arrangement according to claim 1, wherein the thrust ring has a substantially Z-shaped cross-section.

4. The sealing arrangement according to claim 1, wherein the end face of the second leg has a radial projection which is provided at a radial offset from the wall.

5. The sealing arrangement according to claim 4, wherein the radial offset is filled with the coating, and wherein the radial offset is surrounded and coated by the coating.

6. The sealing arrangement according to claim 1 wherein the roller bearing has a radially outer race, and wherein the first leg has a radially inwardly directed first segment, the first segment being angled away from the roller bearing and towards a predetermined space between the side portion and the first leg, the first segment establishing a seal with respect to the space to avoid a contact between the first segment and the inner race of the roller bearing.

7. The sealing arrangement according to claim 6, wherein first leg includes a second segment, the first and second segments being contiguous with one another at a point which is radially between the inner and outer races.

8. The sealing arrangement according to claim 1, wherein the acute angle is between 2° and 15°.

9. The sealing arrangement according to claim 1, wherein the coating and the sealing lip are integrally constructed of a substantially identical material.

10. The sealing arrangement according to claim 1, wherein the acute angle is approximately 7°.

11. A sealing arrangement for sealing a shaft, comprising:

a thrust ring including a first radially inwardly pointing leg and an axially extending second leg, the second leg having radial external characteristic, the thrust ring having a coating composed of an elastomeric material, the coating, under a radial prestressing, being positioned against a wall of a housing which defines a bore hole of the housing, the first leg composed of a hard material, the second leg being at least partially enclosed by the coating on an end face, the end face facing away from a space of the housing to be sealed, the second leg and the coating being positioned against a longitudinal limit stop of the wall in a vibrational isolating manner, the coating separating the longitudinal limit stop from the end face;

a spring member;

a roller bearing provided in a radial direction between the second leg and the shaft, the roller bearing including a radially inner race which has a side portion, the side portion of the inner race extending in a substantially vertical direction; and a rotary shaft seal provided in the bore hole, the seal including a sealing lip which surrounds the shaft, the seal being radially prestressed to arrange the sealing lip on the first leg, the sealing lip provided in an axial direction on a particular side of the roller bearing and on the first leg facing the space in the housing to be sealed, wherein the first leg extends at an acute angle from the side portion of the inner race, and wherein the first leg extends between the roller bearing and the spring member.

12. A sealing arrangement for a shaft located in a bore, comprising:

a spring member;

a roller bearing having an inner ring and an outer ring;

a sealing ring having a radially extending first portion that extends from a radially inner perimeter to an axially extending second portion, the sealing ring having an outer surface and an inner surface; and a seal composed of an elastomeric material and comprising an annular outer portion that is fitted to the outer surface of the sealing ring along the first and second portions, the seal terminating at the radially inner perimeter of the sealing ring with a sealing lip, wherein the first portion is angled with respect to the second portion such that neither the sealing lip nor the sealing ring comes into contact with the inner ring of the roller bearing, wherein the second portion terminates in a radially extending end face which is substantially encased in the elastomeric material so that upon insertion of the sealing arrangement into a bore having a stop limit, the end face is spaced apart from the bore by the elastomeric material and is vibrational isolated from a housing containing the bore, and wherein the first portion extends between the roller bearing and the spring member.

13. The sealing arrangement according to claim 12, wherein the inner ring includes a side portion, the first portion extending at an acute angle from the side portion of the inner ring.

14. A sealing arrangement for sealing a shaft, comprising:

a thrust ring including a first radially inwardly pointing leg and an axially extending second leg, the second leg having radial external characteristic, the thrust ring having a coating composed of an elastomeric material, the coating, under a radial prestressing, being positioned against a wall of a housing which defines a bore hole of the housing, the first leg composed of a hard material, the second leg being at least partially enclosed by the coating on an end face, the end face facing away from a space of the housing to be sealed, the second leg and the coating being positioned against a longitudinal limit stop of the wall in a vibrationally isolating manner, the coating separating the longitudinal limit stop from the end face;

a spring member;

a roller bearing provided in a radial direction between the second leg and the shaft; and a rotary shaft seal provided in the bore hole, the seal including a sealing lip which surrounds the shaft, the seal being radially prestressed to arrange the sealing lip on the first leg, the sealing lip provided in an axial direction on a particular side of the roller bearing and on the first leg facing the space in the housing to be sealed, wherein the first leg extends between the roller bearing and the spring member.

15. The sealing arrangement according to claim 14, wherein the roller bearing includes an inner ring a side portion, the first leg extending at an acute angle from the side portion of the roller bearing includes an inner ring.

* * * * *